Figure 5:
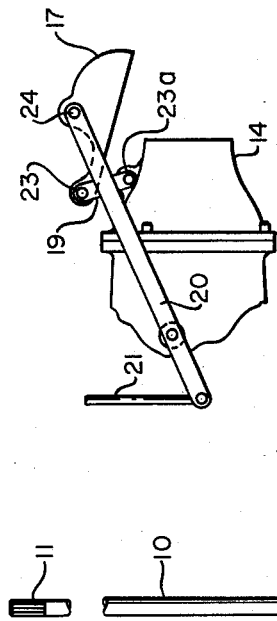

March 26, 1963
R. C. STALLMAN
3,082,732
WATER JET MOTOR FOR BOATS
Filed Dec. 29, 1960
3 Sheets-Sheet 1
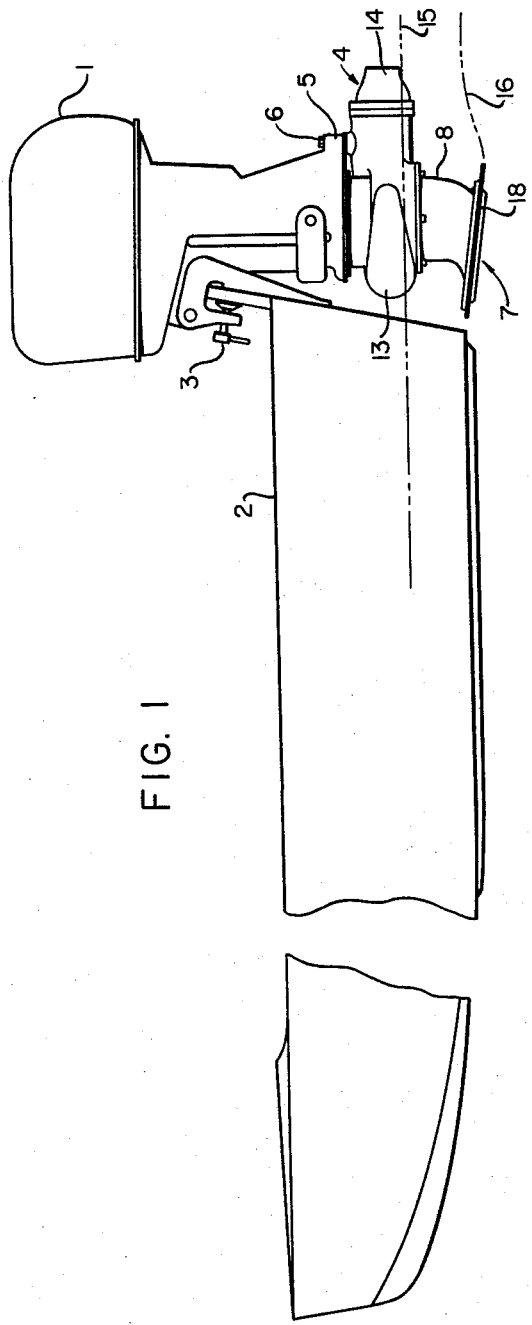
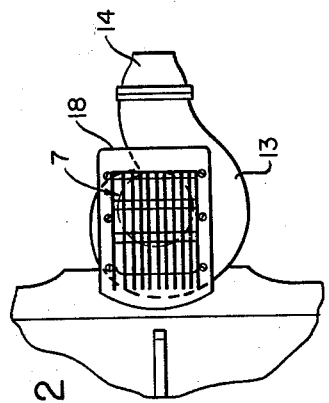
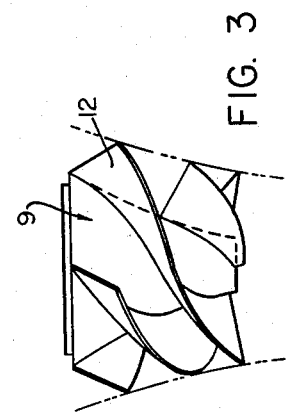
RICHARD C. STALLMAN
*INVENTOR.*
BY
*Flehr and Swain*
ATTORNEYS March 26, 1963  R. C. STALLMAN  3,082,732
WATER JET MOTOR FOR BOATS
Filed Dec. 29, 1960  3 Sheets-Sheet 2

RICHARD C. STALLMAN
*INVENTOR.*

BY

*Flehr and Swain*

ATTORNEYS

March 26, 1963 R. C. STALLMAN 3,082,732
WATER JET MOTOR FOR BOATS
Filed Dec. 29, 1960 3 Sheets-Sheet 3

RICHARD C. STALLMAN
INVENTOR.

BY
*Flehr and Swain*
ATTORNEYS

United States Patent Office

3,082,732
Patented Mar. 26, 1963

---

3,082,732
WATER JET MOTOR FOR BOATS
Richard C. Stallman, 392 De Anza Ave.,
San Carlos, Calif.
Filed Dec. 29, 1960, Ser. No. 79,267
14 Claims. (Cl. 115—16)

This invention relates generally to water jet pumps and more particularly to a water jet motor for boats employing water jet pumps.

Water jet motors are now being applied to the field of small boats, both inboard and outboard. In this method of propulsion, the boat's engine drives a water pump which forces water, at high volume and pressure, through a nozzle directed astern of the boat. In the nozzle, the mass of water is accelerated and the thrust reaction drives the boat forward. The boat can be steered by directing the jet of water.

In the present art, as applied to outboard motors, the water intake systems extend a considerable depth beneath the boat hull and have a large frontal area for the purpose of scooping water into the pump. This results in excessive drag, limits operation to deep water and tends to scoop in rocks and dirt when the intake drags the bottom in shallow water.

In inboard motor applications, the water intakes are flush mounted in the hull bottom. At high boat speeds, the boat rises and the intake does not supply sufficient water to the pump.

The design of various present day jet motors differs. Some jet motors employ as many as three pump stages to develop sufficient pressure. Others employ a single stage pump which develops high pressure at the expense of volume. When the latter type is employed in a boat, the motor provides good speed but with negligible payload. In general then, the present art shows inefficient conversion of horsepower to jet thrust.

Other deficiencies in present day water jet motors for boats are, among others: (a) Provision for steering the boat in reverse is either cumbersome or non-existent; (b) where the engine cooling water is taken from the jet pump, foreign materials plug the filter screens; (c) impeller shaft bearings are a problem to lubricate and seal; and (d) erosion of close fitting sections of the impeller and pump casing necessitates replacement of wear rings to maintain pumping pressure.

It is, therefore, an object of the present invention to provide an improved water jet motor.

It is another object of the present invention to provide an improved water jet pump that can be attached to existing outboard motors.

Other objects of the invention are to provide a water jet pump for boats in which: (a) The water intake section extends a minimum distance below the bottom of the boat and is fitted with scoop vanes to assure sufficient delivery of water to the pump. (b) The trailing edge of the intake section touches bottom in shallow water before the scoop vanes to prevent scooping in rocks and dirt. (c) The pump impeller is of the mixed flow type and provides the proper combination of pressure and volume for best thrust efficiency for a given input horsepower. (d) The edges of the impeller blades form a tapered section in the pump casing such that simple removal of shims will allow adjustment of impeller clearance. (e) A composition type sleeve water-lubricated bearing is used. (f) The coolant water for the engine is taken from the pump through a narrow spinning section of the impeller which acts as a centrifugal separator to remove foreign material. (g) The reversing gate which deflects the jet stream forward, to move the boat backward, is mounted such that it moves in the direction the jet is steered or deflected and thus allows steering in reverse.

These and other objects of the invention will be more clearly apparent from the following description taken in conjunction with the accompanying drawing.

Figure 4:
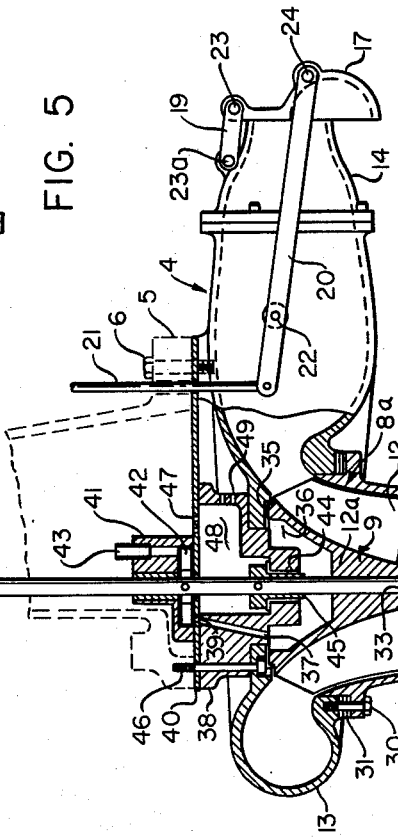
Figure 6:
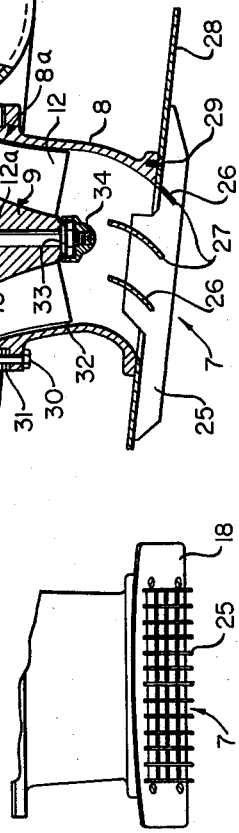
Figure 7:
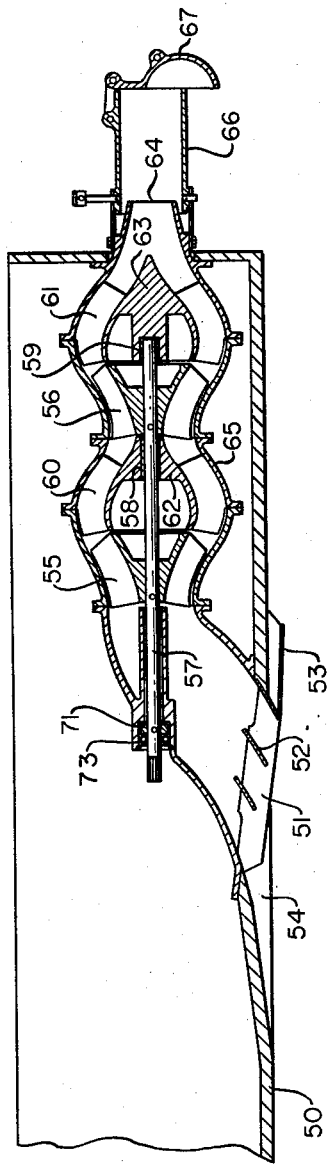
Figure 9:
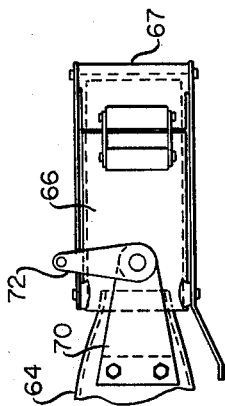
Figure 8:
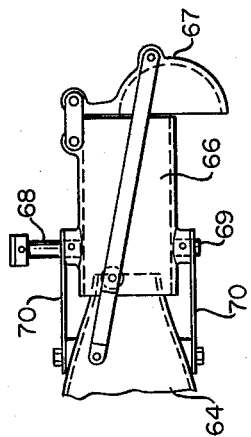

Referring to the drawing:
FIGURE 1 shows a boat and outboard motor including a water jet motor in accordance with the invention;
FIGURE 2 is a bottom view of a portion of the boat and the jet pump;
FIGURE 3 shows a mixed flow type pump impeller;
FIGURE 4 shows a partial side view, partly in section, of the jet pump for outboard motors with a reversing gate;
FIGURE 5 shows the reversing gate of FIGURE 4 in raised position;
FIGURE 6 shows a front view of the jet pump intake section;
FIGURE 7 shows a two-stage jet pump (for inboard motors) with a steering tube and reversing gate;
FIGURE 8 is an enlarged view of the steering tube and reversing gate of FIGURE 7; and
FIGURE 9 is a top view of the steering tube and reversing gate of FIGURE 8.

In FIGURE 1, an outboard motor 1 is shown attached to a boat 2 in the normal manner with suitable clamps 3. The jet pump 4 is suitably attached to the existing flange 5 of the outboard motor with bolts 6. It is observed then that the jet pump replaces the standard outboard motor gearbox and propeller section. Water enters the jet pump through the intake section 7 shown also in FIGURE 2, and enters the casing 8.

The casing 8 has a tapered upper region 8a which increases in diameter towards the upper end. This section accommodates an impeller 9 shown in FIGURES 3 and 4. The impeller is driven by the drive shaft 10, FIGURE 4. The upper spline 11 of the drive shaft 10 engages the power head of the outboard motor in the normal fashion.

The impeller 9 is provided with helically arranged blades or vanes 12 having a predetermined pitch. The vanes are formed integral with or secured to a conical hub 12a. The outer edges of the vanes rotate to define a surface which matches the taper of the casing. Thus, when the impeller is driven by the engine, water is pulled into the pump casing 8 and forced into the recuperation section 13, FIGURE 4. The pitch of the blades 12 on the impeller is such that some spin is also imparted to the water, the spin axis being that of the drive shaft 10. The centrifugal force due to spinning provides part of the pressure that drives the water through the nozzle 14.

The recuperator 13, FIGURE 2, is formed in an ever increasing spiral and thus gathers the spinning water from the impeller in an orderly fashion and directs it into the nozzle.

The water line 15, FIGURE 1, is shown with the boat at rest. It is well known that when a boat picks up sufficient speed to plane, it then skims along on the surface of the water. The water line 16 represents this condition. It can be seen that the intake plate 18 is mounted at an angle, FIGURE 1, with respect to the bottom of the boat and also forms a skimming surface which is, in effect, a continuation of the bottom of the boat. At planing speeds, the casing 8 is not dragged through the water and the nozzle 14 exhausts above water.

The boat is steered by turning the outboard motor, and thus the nozzle, in the normal manner. A reversing gate, not shown in FIGURES 1 and 2, can be attached to the jet pump nozzle section. A gate 17 is shown in FIGURES 4 and 5. In FIGURE 4, the gate is in position for reversing the boat. Here, the water leaving the nozzle is reversed approximately 180° and is directed forward. The thrust reaction on the gate is transmitted through the links 19, FIGURES 4 and 5, and levers 20 to pull the boat backward, providing reverse operation. Here again, the boat is steered by turning the outboard motor and thus directing the thrust. The gate is moved into and out of position by a control rod 21 acting through levers 20 which are pivoted at 22. The ends of the levers 20 are pivoted at 24 to the gate 17 to move the same. The upper end of the gate is pivoted to lever 19 at its upper end and then lever 19 is, in turn, pivoted at 23a to the nozzle. The geometry of the lever system is such that the gate quickly assumes a nearly horizontal position as it is moved toward the open position shown in FIGURE 5. Thus, the jet stream is not deflected by the gate and normal forward operation and steering is accomplished. It is important that the gate does not move in a simple vertical direction when being raised out of the jet stream, since toward the upper position the reversing section of the gate would then direct water over the top of the nozzle and against the stern of the boat. The second advantage of this hinge feature is the use of pivots 22, 23, 23a and 24 with their low friction characteristics. The pivots carry the reverse thrust load transmitted by the levers 19 and 20. The low friction enables easy operation of the gate mechanism.

A front view of the intake grill vanes 25 can be seen in FIGURE 6. These vanes are closely spaced to limit the size of rocks and foreign bodies that can enter the pump. These grill vanes also serve to support the scoop vanes 26. It can be seen that the rear scoop vane forms a continuation of the rear wall of the casing 8. The leading edge 27 of each scoop vane is set at a different level, each being lower than the one in front of it. These scoop vanes scoop and direct the water into the casing 8, and since each is set at a different level, each then has a separate supply of water from directly ahead in the stream. The frontal area presented by the scoop vane pattern can be seen in FIGURE 6. As the boat moves forward, the water which enters this area from directly ahead in the stream is known as ram water. When the boat is at rest, no ram effect is present and all water is pulled in by the impeller alone. The frontal area of the scoop vanes is made sufficient that at top boat speed, the ram water alone is enough to supply all pump needs. At lower boat speeds, in addition to the diminishing amount of ram water, some water is pulled in from below, and thus the leading edge of the scoop vanes are set at an angle to the horizon to allow this flow.

The intake plate 18 extends on all sides beyond the intake opening to provide a water seal and prevent the entrance of air to the pump. The trailing edge 28 of the intake plate extends even lower than the leading edge 27 of the rear scoop vane 26 and will skim the bottom in shallow water and prevent the scoops from shoveling dirt and rocks into the pump. The intake section 7 may be attached to the casing 8 with screws 29.

The casing 8 is attached to the recuperator 13 with bolts 30 and is provided with shims 31. In the event of excessive wear of the impeller blades and casing, the clearance fit 32 increases. To reduce the clearance between the blades 12 and the casing 8, some of the shims can be removed. This allows the casing 8 to move closer to the recuperator 13, and due to the taper of the casing, the clearance will be reduced. The water pressure capability of the pump is thus restored.

A shear pin 33 is provided as the driving means between the impeller 9 and the drive shaft 10. The shear pin 33 and impeller 9 are both retained by the copper nut 34. The shear pin provides protection against costly damage in the event a long narrow object gets through the intake grill. The impeller 9 has a running fit 35 with the recuperator 13 to provide a clearance such that water is allowed to enter space 36. The small clearance 35 prevents the entrance of leaves and light bulky material. The running fit 35 formed between the rotating impeller 9 and the recuperator 13 is of sufficient diameter that it acts as a centrifugal separator and prevents the entrance of small dense materials such as sand. This system acts as a self-cleaning strainer, and thus clean water is supplied to the space 36 where it enters the passageway 37 in the adapter casting 38. The passageway 37 communicates with hole 39 in adapter plate 40. The cooling system booster pump 41 which is removed from the discarded outboard motor propeller housing utilizes a rubber fingered impeller 42 driven by the drive shaft 10. The booster pump is attached to the adapter plate 40 and is used to ensure the flow of cooling water to the engine jackets at low jet pump speeds and pressures. Thus, the cooling water from hole 39 enters the impeller 42, is given a boost in pressure and sent along through passage 43 to the engine jacket system.

A composition flanged sleeve bearing 44 (such as modified Teflon) is fitted into the adapter casting 38 and provides both radial and thrust bearing surfaces. A flanged sleeve 45 is pinned to the drive shaft 10 and transmits the radial and thrust loads from the impeller 9 to the bearing 44. The bearing is water-lubricated and thus requires no seals or other lubrication.

The adapter casting 38 and adapter plate 40 are varied to match the existing flange 5 on different outboard engines. The bolts 46, in addition to bolt 6, serve to attach the jet pump components to the outboard engine.

The engine exhaust gases are directed through holes 47 in the adapter plate 40 into the space 48, and thence through openings 49 in the adapter casting 38 to atmosphere for noise suppression.

The mixed flow-type impeller 9 shown in FIGURE 3 is used since it offers the best performance in this application of converting engine horsepower to jet thrust. It should be noted here that although the open type of impeller is shown, since it allows for adjustment of pump clearance, the closed type (shrouded) impeller can also be used with approximately equal hydraulic performance. It is not the intention of this invention to limit the type of impellers to the open type but rather to open or close mixed flow type.

The following equations apply to jet pump operation:

$$WHP = K_1 QH \tag{1}$$

where $WHP$ = water horsepower
$K_1$ = a constant of proportionality
$Q$ = flow rate
$H$ = pressure head and $$T = K_2 QH^{1/2} \tag{2}$$

where $T$ = jet thrust
$K_2$ = constant of proportionality

It should be noted also that the boat's speed can never equal or exceed the velocity of the jet of water leaving the nozzle. If this should occur, there would be no net thrust imparted to the boat. This is true since the moving boat must pick up its water from a static supply and must give the water more than its own velocity in order to have a net thrust. The nozzle velocity is $$V_1 = K_3 \sqrt{2gH} \tag{3}$$

where $V_1$ = nozzle velocity
$K_3$ = constant of proportionality
$g$ = acceleration due to gravity Sufficient pressure head ($H$) must be created to provide the desired boat speed. Referring back to Equations 1 and 2, if, for a given horsepower a high $H$ is reached at the expense of $Q$, the overall thrust will be low. A very light boat could reach high speeds but could not carry a reasonable payload. Conversely a high $Q$ with a low H would seriously limit top boat speed but would provide excellent tugboat performance for the horsepower used.

A pure centrifugal pump (radial flow) provides high H with low Q. A propeller pump (axial flow) provides low H with high Q. The latter, for jet pump use, must be multistaged to provide sufficient pressure for reasonable boat speed. The present invention employs a mixed flow impeller which utilizes a combination of the characteristics of centrifugal and propeller type impellers. FIGURE 7 shows certain of the aforementioned features applied to an inboard motor boat. The boat hull 50 is fitted with an intake grill system using grill vanes 51, scoop vanes 52 and trailing plate section 53, whose functions were previously described. Here, a tunnel section 54 is provided to supply water to the leading scoop vanes. The jet pump is here shown using two pumping stages. The first stage impeller 55 and second stage impeller 56 are driven by drive shaft 57 which is mounted in water-lubricated bearings 58 and 59 of the type described above. The forward splined end of the drive shaft 57 is supported in a thrust bearing 73 and stuffing box 71 and is suitably coupled to a motive means (not shown). Guide vanes 60 and 61 are attached to the static recuperator sections 62 and 63. These vanes convert water spin velocity to pressure and direct the water through the pump and into the nozzle 64. The multi-sectioned housing 65 serves to encase the impeller. The two pumping stages are preferably used with high r.p.m., high horsepower engines. For lower horsepower and low r.p.m. engines, a single stage can be used and would be represented by impeller 56 and recuperator 63 with vanes 61.

Since the nozzle is not steered, it is fitted with a steering tube 66 and reversing gate 67. In FIGURE 8, an enlarged side view of the steering tube 66 is shown. The tube is turned with the vertcial shafts 68 and 69 which are pivotally mounted by brackets 70 to the nozzle 64.

In the top view, FIGURE 9, the steering arm 72 can be seen. When this arm is moved by a suitable control rod, the tube is turned and directs the jet stream and thus steers the boat. The reverse gate 67 is shown lowered for reverse operation. The gate and its mechanism functions as previously described, and since attachment in this case is made to the steering tube, the reverse thrust can also be directed and hence accomplishes steering in reverse.

I claim:

1. A jet pump of the type adapted for use with an outboard boat motor to drive a boat having a bottom through water comprising a flow through casing having a downstream end portion which is tapered outwardly in the downstream direction, a mixed impeller adapted to rotate about its axis, a substantial portion of said impeller being accommodated in said casing end portion for rotation therein, a recuperator section secured to said end portion to gather the water from the impeller, a converging nozzle communicating with said recuperator whereby the recuperator directs the water into said nozzle, said nozzle disposed at substantially right angles with respect to the axis of the impeller, and skimming intake means carried at the other end of said casing, said skimming intake means providing a skimming surface which is essentially a continuation of the bottom of the boat to skim the water when the boat is in motion with the bottom riding on the surface of the water.

2. A water jet pump as in claim 1 wherein said recuperator is in the form of an ever increasing spiral to gather the spinning water from the impeller and direct it into the nozzle.

3. A water jet pump as in claim 1 wherein said intake means includes a plurality of scoop vanes which skim and direct the water into the casing towards the impeller during motion of the boat.

4. A water jet pump as in claim 3 wherein said vanes project downwardly at progressively deeper horizontal levels in the direction opposite to the direction of travel of the boat whereby each of the vanes has its own water supply from directly ahead.

5. A water jet pump as in claim 1 wherein said intake means includes an intake area and a trailing member which drags the bottom before the intake area can drag.

6. A water jet pump as in claim 1 wherein said intake means includes an intake area and a member extending forward of and around said intake area so that it contacts with the water to inhibit intake of air.

7. A water jet pump as in claim 1 wherein said intake means includes a plate, an intake area, a grill disposed over said intake area to limit the size of foreign bodies which travel into the intake area, a portion of said plate surrounding the intake area in contact with the water to inhibit air intake, intake vanes carried by said plate, said vanes projecting downwardly at progressively deeper horizontal levels in the direction opposite to the direction of travel of the boat whereby each of the vanes has its own water supply from directly ahead, and leading means adapted to skim the water and limit the intake of air.

8. A water jet pump of the type adapted for use with a boat motor to drive a boat having a bottom through water comprising a substantially vertical casing having an upper end portion which is tapered outwardly towards said upper end portion, a mixed flow impeller having vanes which during rotation about its axis define a surface of revolution which has a taper substantially the same as that of the casing taper, said impeller being accommodated within said casing end portion for rotation therein, a recuperator section, said impeller being axially fixed with respect to the recuperator, means for securing said recuperator section to said end portion of the casing, said means including spacing means whereby the position of the casing may be adjusted with respect to the recuperator for adjusting the fit of the impeller within the casing to accommodate for wear, a converging nozzle communicating with said recuperator whereby the recuperator directs the water into the nozzle, and skimming intake means carried at the other end of said casing, said skimming intake means providing a skimming surface which is essentially a continuation of the bottom of the boat to skim the water when the boat is in motion with the bottom riding on the surface of the water.

9. A water jet pump for attachment to an outboard motor to drive a boat through water having a flow through casing having a downstream end portion which is tapered outwardly in the downstream direction, a mixed flow impeller accommodated in said casing end portion for rotation about its axis, a recuperator section secured to said end portion to gather the water from the impeller, a converging nozzle communicating with the recuperator whereby the recuperator directs water into said nozzle, said nozzle disposed at substantially right angles with respect to the axis of the impeller, skimming intake means carried at the other end of said casing, said skimming intake means providing a skimming surface which is essentially a continuation of the bottom of the boat to skim the water when the boat is in motion with the bottom riding on the surface of the water, and an adaptor for connecting the recuperator to the outboard motor housing, said adaptor including means serving to receive and expel exhaust gases from the outboard motor.

10. A water jet pump of the type adapted to drive a boat through water for use with an outboard motor of the type having a water pump for cooling the same comprising a vertical casing having a portion which is tapered outwardly towards one end, an impeller having a hub with an upper rim and vanes secured to said hub, said impeller being substantially accommodated in said casing one end portion for rotation therein, a recuperator section secured to said one end portion to gather the water from the impeller, a stationary surface adjacent to but spaced from said hub rim to provide a space which communicates between the recuperator and the impeller hub rim whereby the centrifugal action of the rotating impeller serves to filter water travelling through the space between the hub rim and said stationary surface from the recuperator to the water pump, a converging nozzle communicating with said recuperator whereby the recuperator directs water into the nozzle, and intake means carried at the other end of said casing.

11. A water jet pump of the type adapted for use in a boat motor to drive a boat through water comprising a flow through casing having a downstream end portion which is tapered outwardly in the downstream direction, a mixed flow impeller accommodated in said tapered casing portion for rotation therein, a recuperator section secured to said end portion to gather water from the impeller, a converging nozzle communicating with the recuperator whereby the recuperator directs the water into said nozzle, said nozzle being disposed at substantially right angles with respect to the casing, and an intake means including a plurality of scooping vanes which project downwardly at the progressively deeper horizontal levels in the direction opposite the direction of travel of the boat whereby each of the vanes has its own water supply from directly ahead.

12. A jet pump of the type adapted for use with an outboard motor to drive a boat having a bottom through water comprising a mixed flow impeller adapted to rotate about its axis, a drive shaft adapted to be connected to be driven by the outboard motor secured to said impeller, a vertical casing serving to accommodate said impeller, a recuperator secured to the upper end of said casing arranged to gather the water from said impeller, said recuperator being in the form of an ever increasing spiral, a converging nozzle section serving to receive the water from said recuperator and discharge the same at substantially right angles with respect to the axis of the impeller, means for securing said jet pump to the outboard motor, said motor being normally movable to direct the jet pump to steer the boat, and intake means provided at the other end of said casing, said intake means including an intake plate having a leading edge to minimize the intake of air forming a continuation of the boat bottom to skim the surface of the water when the boat is riding thereon.

13. In combination with a boat of the type adapted to plane with its bottom skimming on the surface of water an outboard motor detachably secured to the boat, said motor including a drive shaft extending downwardly towards the water and a housing for accommodating said shaft, a water jet pump removably secured to said housing, said pump including a substantially vertical flow through casing having a downstream end portion which tapers outwardly towards the downstream end portion, a mixed flow impeller accommodated substantially entirely within said downstream end portion of the casing, said impeller defining a surface of revolution having the same taper as the casing downstream end portion means for coupling said impeller to said drive shaft to drive the same therefrom, a recuperator section secured to said end portion to gather water from the impeller, a converging nozzle for gathering water from the impeller and recuperator and forming a high velocity jet stream, intake means mounted at the other end of the casing and forming substantially a continuation of the bottom of the boat to skim the water when the boat is planing, said motor being mounted to rotate about an axis parallel to the drive shaft for directing the jet to steer the boat.

14. In combination with a boat of the type adapted to plane with its bottom skimming on the surface of water an outboard motor detachably secured to the boat, said motor including a drive shaft extending downwardly towards the water and a housing for accommodating said shaft, a water jet pump removably secured to said housing, said pump including a substantially vertical flow through casing having a downstream end portion which tapers outwardly toward the downstream end portion, a mixed flow impeller accommodated substantially entirely within said downstream end portion of the casing, means for adjusting the axial position of the impeller along the casing, said impeller defining a surface of revolution having the same taper as the casing, means for coupling said impeller to said drive shaft to drive the same therefrom, a recuperator section secured to said end portion to gather water from the impeller, a converging nozzle for gathering water from the impeller and recuperator and forming a high velocity jet stream, intake means mounted at the other end of the casing and forming substantially a continuation of the bottom of the boat to skim the water when the boat is planing, said motor being mounted to rotate about an axis parallel to the drive shaft for directing the jet to steer the boat.

References Cited in the file of this patent

UNITED STATES PATENTS

| 6,468 | Ruthuen | May 22, 1849 |
| 55,773 | Kinkel et al. | June 19, 1866 |
| 164,033 | Pratt | June 1, 1875 |
| 1,554,591 | Oliver | Sept. 22, 1925 |
| 2,024,274 | Campini | Dec. 17, 1935 |
| 2,259,153 | Conover | Oct. 14, 1941 |
| 2,702,516 | Tinker | Feb. 22, 1955 |
| 3,035,409 | Pifer | May 22, 1962 |

FOREIGN PATENTS

| 812,229 | France | Feb. 15, 1937 |
| 1,025,254 | France | Jan. 21, 1953 |
| 902,229 | Germany | Oct. 18, 1954 |
| 285,335 | Great Britain | Feb. 16, 1928 |

OTHER REFERENCES

Yachting Magazine article, "Wet Jet Propulsion," vol. 106, No. 5, pages 70–71, November 1959.